(12) United States Patent
Tomii

(10) Patent No.: US 7,107,948 B2
(45) Date of Patent: Sep. 19, 2006

(54) ENGINE SYSTEM AND VEHICLE

(75) Inventor: Eiji Tomii, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/318,977

(22) Filed: Dec. 27, 2005

(65) Prior Publication Data

US 2006/0157024 A1 Jul. 20, 2006

(30) Foreign Application Priority Data

Dec. 28, 2004 (JP) ............................. 2004-381509

(51) Int. Cl.
*F01L 1/34* (2006.01)
(52) U.S. Cl. ................... 123/90.15; 123/346; 123/403; 123/90.17
(58) Field of Classification Search ............. 123/90.15, 123/90.16, 90.17, 90.18, 90.27, 90.31, 345, 123/346, 399, 403
See application file for complete search history.

(56) References Cited

U.S. PATENT DOCUMENTS 6,039,026 A 3/2000 Shiraishi et al.

6,851,409 B1 * 2/2005 Machida et al. ............ 123/399

FOREIGN PATENT DOCUMENTS

JP 11-117777 4/1999

\* cited by examiner

*Primary Examiner*—Thomas Denion
*Assistant Examiner*—Ching Chang
(74) *Attorney, Agent, or Firm*—Keating & Bennett, LLP

(57) ABSTRACT

An engine system includes an engine and an engine control unit. The engine includes an intake valve that opens and closes the opening of a cylinder, a valve actuator that drives the intake valve and can arbitrarily control the lift amount of the intake valve, an intake passage that introduces air and fuel into the cylinder through the opening of the cylinder, and a throttle valve provided to open and close the opening of the intake passage and control the quantity of air to be introduced into the cylinder in response to a load required by a driver. During intake operation in substantially all the load states of the engine, the valve actuator is controlled so that the opening area of the opening determined by the lift amount of the intake valve is not less than the opening area of the opening determined by the opening degree of the throttle valve.

13 Claims, 8 Drawing Sheets

ENGINE SYSTEM AND VEHICLE

BACKGROUND OF THE INVENTION

1. Field of the Invention

The present invention relates to an engine system and a vehicle including the same, and more particularly to an engine system including a valve driving device that drives an intake valve and a vehicle including the engine system.

2. Description of the Background Art

There have been conventionally known valve driving devices operable to drive an intake valve in an engine such as a mechanical valve driving device including a lift variable mechanism that changes the lift amount of an intake valve, and a hydraulic valve driving device operable to control the lift amount of an intake valve at an arbitrary level by oil pressure.

In a conventional mechanical valve driving device including a lift variable mechanism, when the lift amount of the intake valve changes, the valve timing changes accordingly. Therefore, in order to achieve the optimum lift amount and the optimum valve timing at the same time, it is necessary to provide a timing variable mechanism independently of the lift variable mechanism. This complicates the structure of the valve driving device.

In a conventional hydraulic valve driving device, the lift amount and valve timing of the intake valve can arbitrarily be controlled, so that the structure is not complicated.

In the hydraulic valve driving device, however, fluctuations in the lift amount of the intake valve are greater than those in the mechanical valve driving device. Therefore, in an extremely low load state with a very small lift amount such as at idle, the ratio of the fluctuation amount in the lift amount of the intake valve to the lift amount of the intake valve is large. This greatly changes the quantity of air taken into the cylinder through an opening where the intake valve is provided in the extremely low load state such as at idle. Consequently, the air-fuel ratio is liable to change, and the engine speed of the engine is likely to fluctuate accordingly.

An internal combustion engine (engine) that controls the power of the engine using a throttle valve at idle (in an extremely low load state) and in a high load state and by fully opening the throttle valve in a low to middle load state has been proposed (see for example JP 11-117777 A).

In the disclosure of JP 11-117777 A, the power of the engine is controlled using the throttle valve at idle (in the extremely low load state), and therefore when the lift amount of the intake valve fluctuates, fluctuation in the air-fuel ratio can be controlled, and fluctuation in the engine speed of the engine can be controlled accordingly.

In the disclosure of JP 11-117777 A, however, since the power of the engine is controlled using the throttle valve at idle (in the extremely low load state) and in the high load state, and the power of the engine is controlled using the intake valve in the low to middle load state, it is necessary to switch between the control by the throttle valve and the control by the intake valve among different load states of the engine.

Therefore, an additional driving device such as an actuator must be provided to fully open the throttle valve independently of the accelerate operation in the low to middle load state. This complicates the structure of the engine.

SUMMARY OF THE INVENTION

In order to overcome the problems described above, preferred embodiments of the present invention provide an engine system allowing the engine speed of an engine to be prevented from fluctuating and a vehicle including the engine system without the necessity of complicating the structure of the engine.

(1)

An engine system according to a preferred embodiment of the present invention includes an engine and a control device that controls the engine, the engine includes a cylinder having a first opening, an intake valve that opens and closes the first opening, a valve driving device operable to drive the intake valve and arbitrarily control the lift amount of the intake valve, an intake passage having a second opening and arranged to introduce air and fuel into the cylinder from the first opening through the second opening, and a throttle valve provided to open and close the second opening of the intake passage and control the quantity of air to be introduced into the cylinder in response to a load required by a user, and the control device controls the valve driving device during intake operation in substantially all the load states of the engine so that the opening area of the first opening determined by the lift amount of the intake valve is at least equal to the opening area of the second opening determined by the opening degree of the throttle valve.

In the engine system, the valve driving device is controlled during intake operation in substantially all the load states of the engine so that the opening area of the first opening determined by the lift amount of the intake valve is at least equal to the opening area of the second opening determined by the opening degree of the throttle valve. In this way, in substantially all the load states of the engine, the quantity of air to be taken into the engine can be controlled using the throttle valve. Therefore, it is not necessary to switch between control by the throttle valve and control by the intake valve among different load states of the engine, and the throttle valve does not have to be operated independently of the accelerate operation. This eliminates the necessity for an additional driving device such as an actuator that allows the throttle valve to operate independently of the accelerate operation. Therefore, the engine system may have a simplified structure.

Furthermore, the quantity of air taken into the cylinder can be controlled using the throttle valve, and therefore if the lift amount of the intake valve fluctuates, the quantity of air to be sent into the cylinder can be prevented from fluctuating. Therefore, the engine speed of the engine can be prevented from fluctuating.

Consequently, the engine speed of the engine can be prevented from fluctuating without the necessity of complicating the structure of the engine system. Furthermore, using the valve driving device that can arbitrarily control the lift amount of the intake valve, the intake valve does not have to be lifted more than necessary in the extremely low load state such as at idle. This allows the energy loss to be reduced.

(2)

During intake operation in substantially all the load states of the engine, the control device may control the valve driving device so that the average flow rate at the first opening determined by the lift amount of the intake valve is at most equal to the average flow rate at the second opening determined by the opening degree of the throttle valve.

In this way, the quantity of air to be taken into the engine can readily be controlled using the throttle valve. Therefore, during intake operation, when the lift amount of the intake valve fluctuates, the quantity of air to be taken into the engine can readily be prevented from fluctuating. Consequently, the engine speed of the engine can readily be prevented from fluctuating.

(3)

During intake operation in substantially all the load states of the engine, the control device may control the valve driving device so that the average flow rate at the first opening determined by the lift amount of the intake valve is substantially equal to the average flow rate at the second opening by the throttle valve.

In this way, the quantity of air to be taken into the cylinder through the first opening where the intake valve is provided from the second opening where the throttle valve is provided can be prevented from greatly fluctuating. This allows a smooth flow of air to form. Therefore, as compared to the case in which a greatly fluctuating air flow is taken into the cylinder through the first opening, the resistance of the air as the air passes through the first opening can be reduced, so that the pump loss can be reduced.

In addition, the valve driving device is controlled so that the average flow rate at the first opening determined by the lift amount of the intake valve is substantially equal to the average flow rate at the second opening determined by the opening degree of the throttle valve. In this way, it is not necessary to set the lift amount of the intake valve to a more than necessary level in the extremely low load state such as at idle, which allows the energy loss to be reduced.

(4)

During intake operation in substantially all the load states of the engine, when the opening area of the first opening fluctuates because of fluctuation in the lift amount of the intake valve, the control device may control the valve driving device so that the fluctuated opening area of the first opening is at least equal to the opening area of the second opening determined by the opening degree of the throttle valve.

In this way, when the lift amount of the engine fluctuates, the opening area of the first opening determined by the lift amount of the intake valve can readily be controlled to be not less than the opening area of the second opening determined by the opening degree of the throttle valve during intake operation in substantially all the load states.

(5)

The substantially all the load states of the engine may include a predetermined first load state and a second load state higher than the first load state, and the control device may control the valve driving device so that the difference between the opening area of the first opening determined by the lift amount of the intake valve and the opening area of the second opening determined by the opening degree of the throttle valve in the first load state is greater than that in the second load state.

(6)

The control device may control the valve driving device so that the difference between the opening area of the first opening determined by the lift amount of the intake valve and the opening area of the second opening determined by the opening degree of the throttle valve in the first load state gradually increase from the second load state to the first load state.

In this way, in the low load state of the engine, even when the opening area of the second opening determined by the opening degree of the throttle is reduced, the opening area of the first opening determined by the lift amount of the intake valve can be prevented from being excessively small.

In this way, the ratio of the fluctuation amount in the lift amount of the intake valve to the lift amount of the intake valve can be prevented from increasing because of an excessive reduction in the lift amount of the intake valve. Consequently, the fluctuation ratio in the engine speed of the engine can be prevented from increasing.

(7)

The control device may control the valve driving device so that in a substantially maximum power state of the engine, the opening area of the first opening determined by the lift amount of the intake valve is substantially equal to the opening area of the second opening determined by the opening degree of the throttle valve.

In this way, while the ratio of the fluctuation amount in the lift amount of the intake valve to the lift amount of the intake valve is kept small, high power can be obtained.

(8)

The engine system may further include a throttle opening degree detector that detects the opening degree of the second opening by the throttle valve, and a lift amount detector that detects the lift amount of the intake valve, and the control device may control the valve driving device based on the results of detection by the throttle opening degree detector and the lift amount detector.

In this way, the lift amount of the intake valve and the opening degree of the throttle valve can readily be detected. Therefore, the valve driving device can readily be controlled so that the opening area of the first opening determined by the lift amount of the intake valve is at least equal to the opening area of the second opening determined by the opening degree of the throttle valve.

(9)

The control device may include a first opening area calculator that calculates the opening area of the second opening determined by the opening degree of the throttle valve based on the result of detection by the throttle opening degree detector, a second opening area calculator that calculates the opening area of the first opening corresponding to the opening area of the second opening based on the result of calculation by the first opening area calculator, a target lift position calculator that calculates a target lift position based on the result of calculation by the second opening area calculator, a lift fluctuation amount determiner that determines a lift fluctuation amount based on the result of calculation by the target lift position calculator and the result of detection by the lift amount detector, and a lift amount changer that changes the lift amount of the intake valve by the valve driving device by the lift fluctuation amount determined by the fluctuation amount determiner.

In this way, the lift amount of the intake valve by the valve driving device can readily be changed so that the opening area of the first opening determined by the lift amount of the intake valve is at least equal to the opening area of the second opening determined by the opening degree of the throttle valve.

(10)

The control device may control the valve driving device so that the lift amount of the intake valve increases when at least one of the ratio of fluctuation in the engine speed of the engine and the ratio of fluctuation in the indicated mean effective pressure of the engine is at least equal to a prescribed value.

In this way, the ratio of the fluctuation amount in the lift amount of the intake valve to the lift amount of the intake valve can be reduced. Therefore, the fluctuation ratio in the quantity of air to be taken into the cylinder can be reduced. The fluctuation ratio in the engine speed of the engine and the fluctuation ratio in the indicated mean effective pressure of the engine can be reduced. Consequently, the engine can be operated in a stable manner.

(11)

The substantially all the load states of the engine may include a predetermined first load state and a second load state higher than the first load state, and the control device may control the valve driving device so that the lift amount of the intake valve and the working angle of a crank corresponding to the opening period of the intake valve in the second load state are larger than those in the first load state.

In this way, the lift amount of the intake valve and the opening period of the intake valve in the high load state increase, so that the amount of intake air can be increased in the high load state.

(12)

The substantially all the load states of the engine may include a predetermined first load state and a second load state higher than the first load state, and the control device may control the valve driving device so that the lift amount of the intake valve and the working angle of a crank corresponding to the opening period of the intake valve in the first load state are smaller than those in the second load state.

In this way, the intake valve can be prevented from being driven more than necessary in the low load state of the engine. This allows the energy loss to be reduced. The valve driving device can be controlled so that the working angle of the crank corresponding to the valve opening period of the intake valve is reduced in the low load state of the engine, and therefore the opening can be prevented from being opened during exhaust strokes. Consequently, exhaust gas can be prevented from returning to the intake passage through the first opening.

(13)

A vehicle according to another preferred embodiment of the invention includes an engine, a driving wheel rotated by power generated by the engine, and a control device that controls the engine, the engine includes a cylinder having a first opening, an intake valve that opens and closes the first opening, a valve driving device operable to drive the intake valve and arbitrarily control the lift amount of the intake valve, an intake passage having a second opening and arranged to introduce air and fuel into the cylinder from the first opening through the second opening, and a throttle valve provided to open and close the second opening of the intake passage and control the quantity of air to be introduced into the cylinder in response to a load required by a user, and the control device controls the valve driving device during intake operation in substantially all the load states of the engine so that the opening area of the first opening determined by the lift amount of the intake valve is at least equal to the opening area of the second opening determined by the opening degree of the throttle valve.

In the vehicle, the engine is controlled by the control device and the driving wheel is rotated by the power generated by the engine.

In the engine, during intake operation in substantially all the load states of the engine, the valve driving device is controlled so that the opening area of the first opening determined by the lift amount of the intake valve is at least equal to the opening area of the second opening determined by the opening degree of the throttle valve. In this way, in substantially all the load states, the quantity of air to be taken into the engine can be controlled using the throttle valve. Therefore, it is not necessary to switch between the control by the throttle valve and the control by the intake valve among different load states of the engine, and the throttle valve does not have to be operated independently of the accelerate operation. This eliminates the necessity for an additional driving device such as an actuator that allows the throttle valve to operate independently of the accelerate operation. Therefore, the engine can have a simplified structure.

The quantity of air to be taken into the cylinder can be controlled using the throttle valve, and therefore when the lift amount of the intake valve fluctuates, the quantity of air to be taken into the cylinder can be prevented from fluctuating. In this way, the engine speed of the engine can be prevented from fluctuating.

Consequently, the engine speed of the engine can be prevented from fluctuating without the necessity of complicating the structure of the engine system. Using the valve driving device that can arbitrarily control the lift amount of the intake valve, the intake valve does not have to be lifted more than necessary in the extremely low load state such as at idle. This allows the energy loss to be reduced.

Other features, elements, characteristics, and advantages of the present invention will become more apparent from the following description of preferred embodiments of the present invention with reference to the attached drawings.

DETAILED DESCRIPTION OF THE PREFERRED EMBODIMENTS

Now, preferred embodiments of the invention will be described with reference to the accompanying drawings. Note that in the following description of the preferred embodiments, a motorcycle will be described as an example of a vehicle according to the invention.

(1) Structure of Engine

Figure 1:
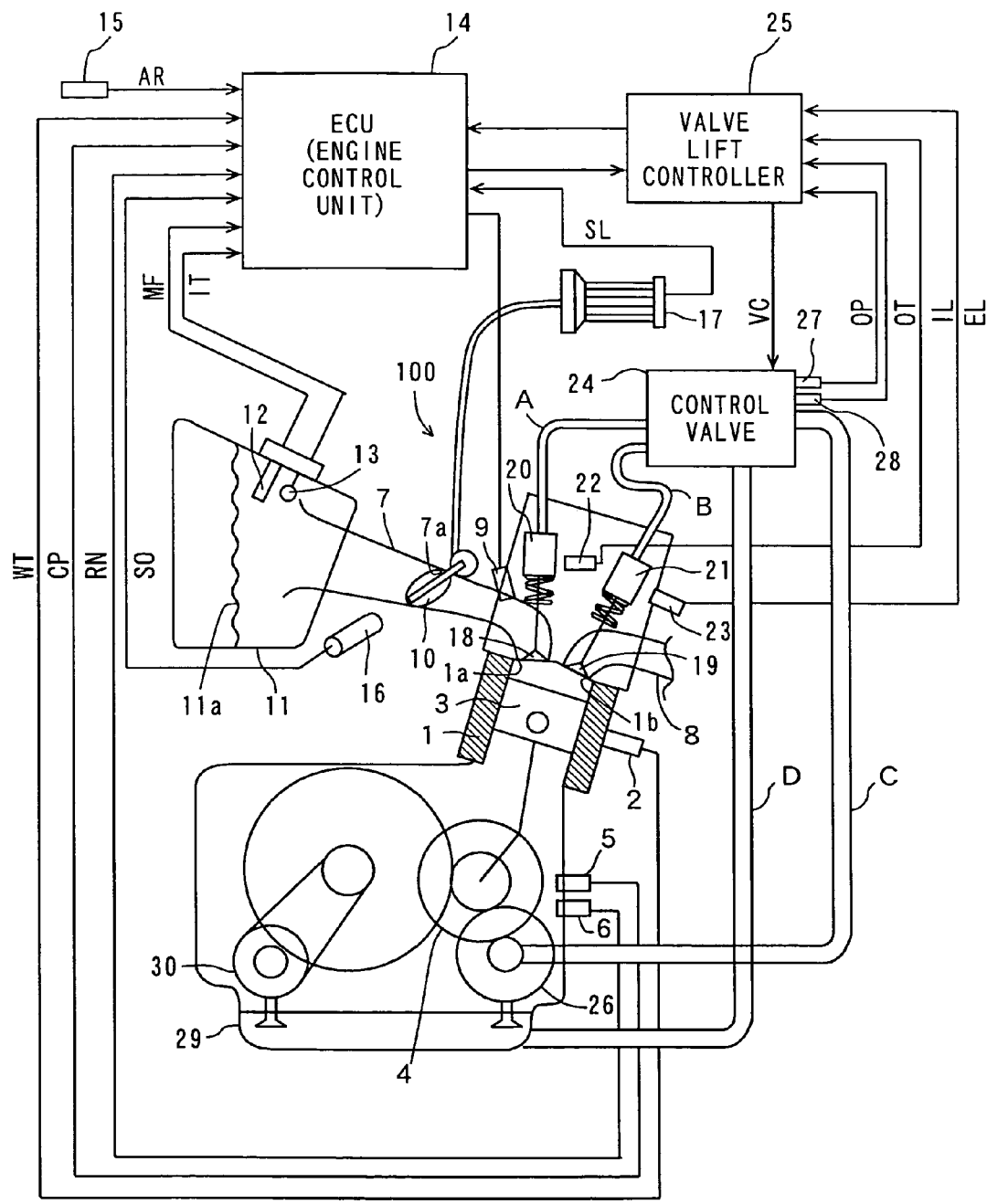
FIG. 1 is a schematic view illustrating an engine system including a hydraulic valve driving device according to a preferred embodiment of the invention.

FIG. 1 is a schematic view illustrating an engine system including a hydraulic valve driving device according to a preferred embodiment of the invention.

The engine system in FIG. 1 includes an engine 100 and an engine control unit (ECU) 14. The engine 100 includes a water temperature sensor 2 provided in the vicinity of a side surface of a cylinder 1 to measure water temperature in the engine 100. A piston 3 provided in the cylinder 1 can reciprocate therein. A crank 4 that drives the piston 3 is provided under the piston 3. On a side of the crank 4, a crank angle sensor 5 and a rotation number sensor 6 are provided to detect the angle and the rotation number of the crank 4, respectively.

The openings 1a and 1b of the cylinder 1 are connected with an intake passage 7 and an exhaust passage 8, respectively. A fuel injection device 9 is provided in the intake passage 7.

A throttle valve 10 that opens and closes the opening 7a of the intake passage 7 is attached to the intake passage 7. An air cleaner 11 having a filter 11a that prevents foreign substances such as dust from coming into the intake passage 7 is provided upstream of the intake passage 7. A mass flow sensor 12 and an intake air temperature sensor 13 that detect the mass flow rate and the intake air temperature of intake air respectively are provided upstream of the throttle valve 10 in the intake passage 7. The mass flow sensor 12 and the intake air temperature sensor 13 apply a mass flow rate signal MF and an intake air temperature signal IT respectively to the engine control unit 14. An atmospheric pressure signal AR is applied to the engine control unit 14 from an atmospheric pressure sensor 15 that measures atmospheric pressure.

A throttle opening degree sensor 16 that detects a throttle opening degree is provided in the vicinity of the throttle valve 10. A throttle opening degree signal SO is applied from the throttle opening degree sensor 16 to the engine control unit 14. The throttle valve 10 is electrically connected to a throttle grip 17 provided at a side end of a handle (not shown). The driver inputs a required load using the throttle grip 17. The opening degree of the throttle valve 10 changes in association with the throttle grip 17, so that the opening area of the opening 7a of the intake passage 7 is controlled accordingly.

An intake valve 18 and an exhaust valve 19 that open/close the openings 1a and 1b of the cylinder 1 respectively are provided above the piston 3. The intake valve 18 and the exhaust valve 19 are provided with valve actuators 20 and 21 that drive the intake valve 18 and the exhaust valve 19, respectively. Valve lift sensors 22 and 23 are provided in the vicinities of the valve actuators 20 and 21, respectively. The valve lift sensors 22 and 23 indirectly detect the lift amounts of the intake valve 18 and the exhaust valve 19 by detecting the driving amounts of the valve actuators 20 and 21, respectively. The valve actuators 20 and 21 are connected to a control valve 24 through hydraulic paths A and B, respectively.

The control valve 24 switches between the hydraulic paths to control the oil pressure to be supplied to the valve actuators 20 and 21. The control valve 24 turns on/off an electromagnetic valve (not shown) in response to a valve control signal VC applied from a valve lift controller 25, so that the hydraulic paths A and B are opened/closed accordingly. The control valve 24 is supplied with oil from an oil pump 26 through a high pressure pipe C.

An oil pressure sensor 27 and an oil temperature sensor 28 that detect the pressure and temperature of the oil at the control valve 24 respectively are provided on a side of the control valve 24.

The hydraulic valve driving device includes the intake valve 18, the exhaust valve 19, the valve actuators 20 and 21, the valve lift sensors 22 and 23, the control valve 24, the valve lift controller 25, the oil pump 26, the oil pressure sensor 27, and the oil temperature sensor 28. The intake valve 18 opens and closes the opening 1a of the cylinder 1 by the function of the valve actuator 20.

The control valve 24 is connected to an oil tank 29 through a return pipe D. When the intake valve 18 and the exhaust valve 19 are closed, oil is discharged from the control valve 24 to the oil tank 29 through the return pipe D. The oil in the oil tank 29 is supplied by a lubrication pump 30 to the crank 4 and the like as lubricant oil and also supplied to the oil pump 26.

The valve lift controller 25 is provided with an oil pressure signal OP from the oil pressure sensor 27, an oil temperature signal OT from the oil temperature sensor 28, an intake valve lift signal IL from the valve lift sensor 22, and an exhaust valve lift signal EL from the valve lift sensor 23.

The engine control unit 14 is provided with a water temperature signal WT from the water temperature sensor 2, a crank position signal CP from the crank angle sensor 5, a rotation number signal RN from the rotation number sensor 6, a throttle opening degree signal SO from the throttle opening degree sensor 16, a mass flow rate signal MF from the mass flow sensor 12, an intake air temperature signal IT from the intake air temperature sensor 13, the atmospheric pressure signal AR from the atmospheric pressure sensor 15, and a setting load signal SL from the throttle grip 17.

The valve lift controller 25 and the engine control unit 14 are electrically connected to each other and can share externally applied signals.

The valve lift controller 25 can control the valve opening and closing timings of the intake valve 18 and the exhaust valve 19 in response to the crank position signal CP, the rotation number signal RN, the setting load signal SL, the oil pressure signal OP, the oil temperature signal OT, the intake air temperature signal IT, and the atmospheric pressure signal AR.

The engine control unit 14 determines the injection amount of the fuel from device 9 based on the mass flow rate signal MF and the intake air temperature signal IT and allows fuel to be injected from the fuel injection device 9 in a prescribed timing based on the crank position signal CP. The engine control unit 14 can calculate the opening area of the opening 7a of the intake passage 7, and the target opening area and the target lift position of the opening 1a of the cylinder 1 based on the throttle opening degree signal SO. The engine control unit 14 determines the lift amounts of the intake valve 18 and the exhaust valve 19 based on the target lift position and the intake valve lift signal IL and the exhaust valve lift signal EL from the valve lift controller 25.

(2) Opening Degree of Throttle Valve 10

Figure 2:
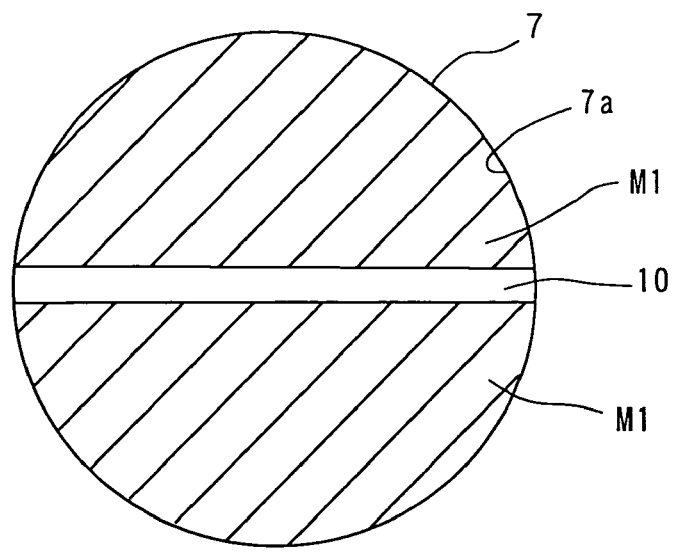
FIG. 2 is a sectional view illustrating a throttle valve in the maximum power state of the engine in FIG. 1.
Figure 3:
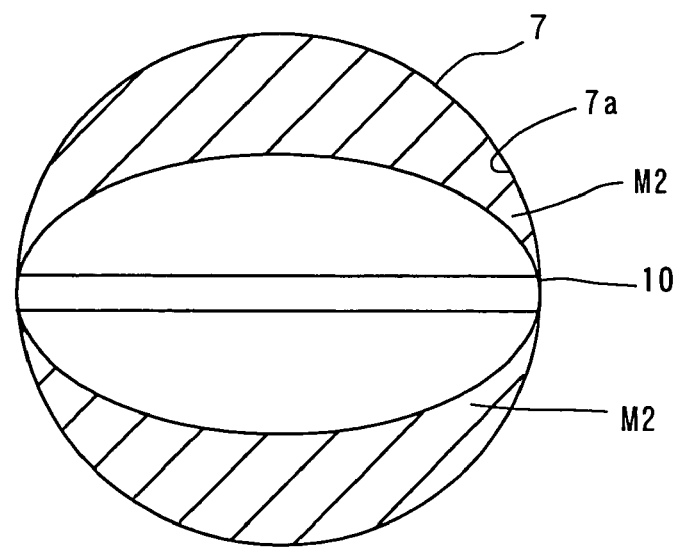
FIG. 3 is a sectional view illustrating the throttle valve in the middle load state of the engine in FIG. 1.

FIG. 2 is a sectional view illustrating a throttle valve in the maximum power state of the engine in FIG. 1, and FIG. 3 is a sectional view illustrating the throttle valve in the middle load state of the engine in FIG. 1.

As shown in FIG. 2, in the maximum power state of the engine 100, the opening degree of the throttle valve 10 is so set that the opening area M1 of the opening 7a (the area of the hatching region in FIG. 2) is maximum.

As shown in FIG. 3, in the middle load state of the engine 100, the opening degree of the throttle valve 10 is so set that the opening area M2 (the area of the hatching region in FIG. 3) is smaller than the opening area M1 (see FIG. 2) in the maximum power state of the engine 100.

(3) Opening Degree of Intake Valve 18

Figure 4:
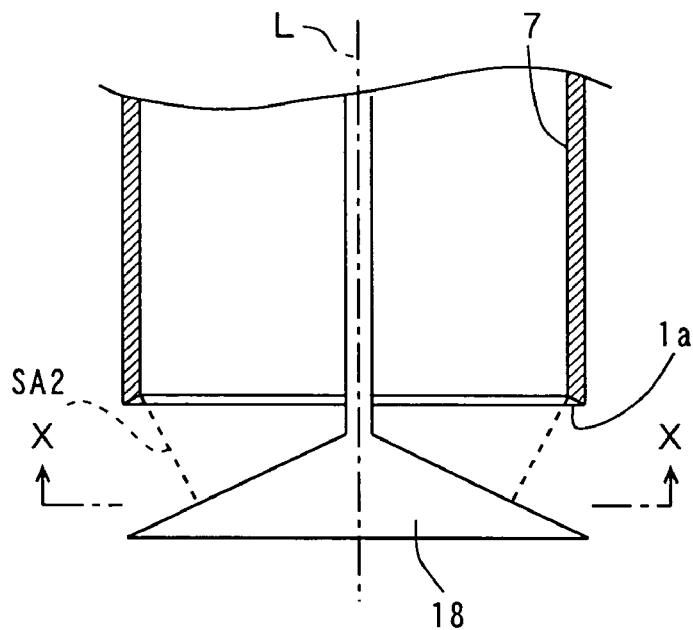
FIG. 4 is a sectional view illustrating the intake valve in the maximum power state of the engine in FIG. 1.
Figure 5:
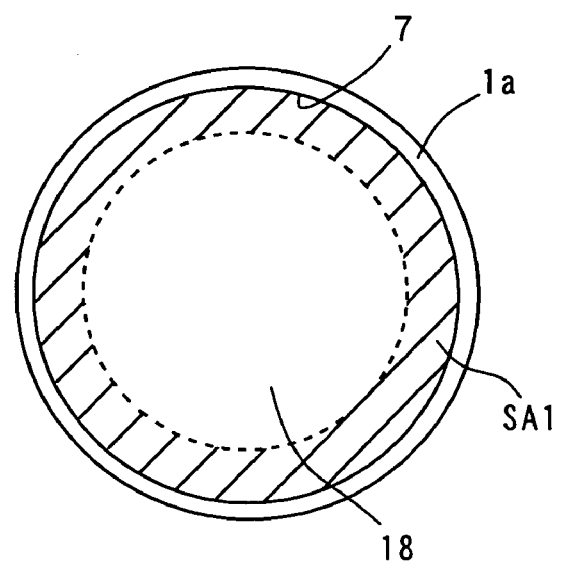
FIG. 5 is a sectional view taken along line X—X in FIG. 4.
Figure 6:
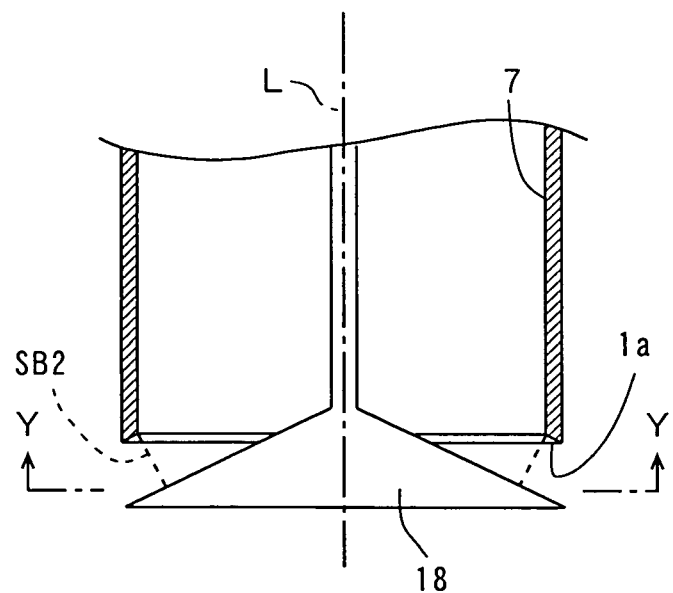
FIG. 6 is a view illustrating the intake valve in the middle load state of the engine in FIG. 1.

FIG. 4 is a sectional view illustrating the intake valve in the maximum power state of the engine in FIG. 1, and FIG. 5 is a sectional view taken along line X—X in FIG. 4. FIG. 6 is a view illustrating the intake valve in the middle load state of the engine in FIG. 1, and FIG. 7 is a sectional view taken along line Y—Y in FIG. 6.

Herein, the opening area of the intake valve 18 with the maximum lift in the maximum power state of the engine 100 is N1, and the opening area of the intake valve 18 with the maximum lift in the middle load state of the engine 100 is N2.

As shown in FIGS. 4 and 5, in the maximum power state of the engine 100, the intake valve 18 is allowed to open so that the opening area N1 with the maximum lift is maximized. Note that the opening area N1 in the maximum power state of the engine 100 is equal in a plan view to the area of the hatching region SA1 in FIG. 5 and is also equal to the lateral area of a truncated cone formed as the dotted line SA2 shown in FIG. 4 is turned around the central axial line L of the intake valve 18.

Figure 7:
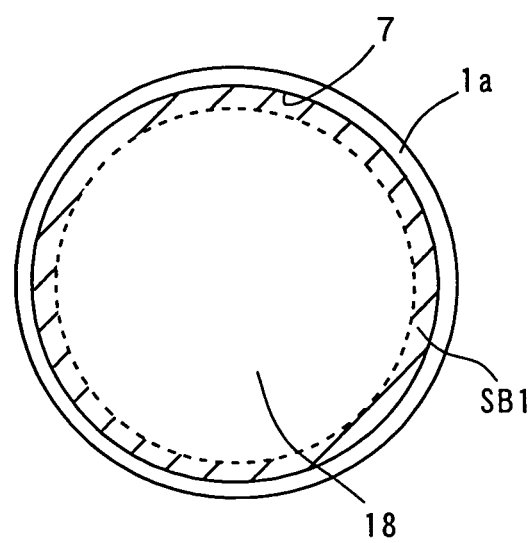
FIG. 7 is a sectional view taken along line Y—Y in FIG. 6.

As shown in FIGS. 6 and 7, in the middle load state of the engine 100, the intake valve 18 is allowed to open so that the opening area N2 of the intake valve 18 with the maximum lift is smaller than the opening area N1 of the intake valve 18 with the maximum lift in the maximum power state of the engine 100. Note that the opening area N2 in the middle load state of the engine 100 is equal in a plan view to the area of the hatching region SB1 in FIG. 7, and is also equal to the lateral area of a truncated cone formed as the dotted line SB2u shown in FIG. 6 is turned around the central axial line L of the intake valve 18.

(4) Control of Intake Valve 18 and Throttle Valve 10

Figure 8:
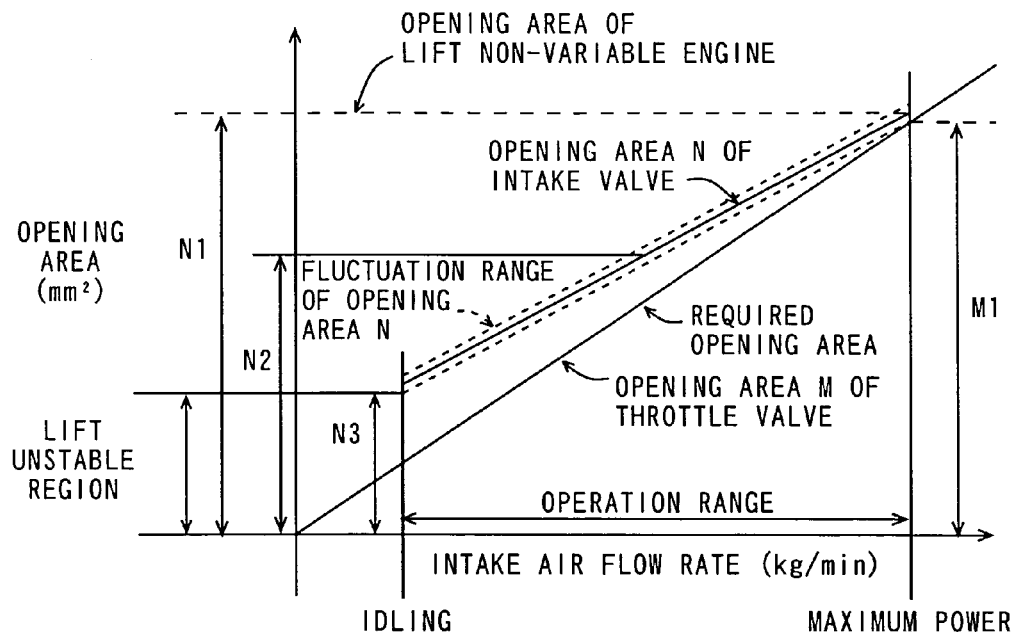
FIG. 8 is a graph illustrating in detail control of the intake valve and the throttle valve depending on the load state of the engine in FIG. 1.

FIG. 8 is a graph illustrating in detail control of the intake valve and the throttle valve depending on the load state of the engine in FIG. 1.

In FIG. 8, the abscissa represents the intake air flow rate (kg/min), and the ordinate represents the opening area N (the opening area of the intake valve 18) of the opening 1a of the cylinder 1 and the opening area M (the opening area of the throttle valve 10) of the opening 7a in the intake passage 7.

Herein, the opening area of the opening 1a of the cylinder 1 with the maximum lift in the maximum power state is N1, and the opening area of the opening 1a of the cylinder 1 with the maximum lift at idle is N3. The opening area of the opening 7a in the intake passage 7 in the maximum power state is M1.

As shown in FIG. 8, the opening area M of the opening 7a in the intake passage 7 is controlled to be a necessary area for a necessary intake air flow rate (kg/min) in substantially all the load states of the engine 100 from the low load state (the extremely low load state) to the high load state.

The opening area N of the opening 1a of the cylinder 1 with the maximum lift for the intake valve 18 is controlled to be not less than the opening area M of the opening 7a of the intake passage 7 in substantially all the load states of the engine 100 from the low load state (the extremely low load state) to the high load state.

Now, when the masses of air passing through the openings 1a and 7a per unit time are Q1 and Q2, respectively, the average flow rate v1 at the opening 1a and the average flow rate v2 at the opening 7a of the intake passage 7 with the maximum lift for the intake valve 18 are represented by the following Expressions (1) and (2), respectively:

$$v1 = Q1/N (\text{kg/m}^2 \cdot \text{s}) \quad (1)$$

$$v2 = Q2/M (\text{kg/m}^2 \cdot \text{s}) \quad (2)$$

According to the preferred embodiment, the opening area M of the upstream opening 7a is not more than the opening area N of the downstream opening 1a, and therefore the quantity of air passed through the downstream opening 1a is restricted by the quantity of air passed through the upstream opening 7a. In this way, the masses Q1 and Q2 of air passed through the openings 1a and 7a per unit time are equal. In this case, the opening area N of the opening 1a is not less than the opening area M of the opening 7a, and therefore the average flow rate v1 at the opening 1a of the cylinder 1 is not more than the average flow rate v2 at the opening 7a of the intake passage 7 according to Expressions (1) and (2).

In substantially all the load states of the engine 100, the difference between the opening area N of the opening 1a of the cylinder 1 and the opening area M of the opening 7a of the intake passage 7 with the maximum lift for the intake valve 18 is controlled to be greater in the low load state of the engine 100 than in the high load state.

In substantially all the load states of the engine 100, the opening area N of the opening 1a of the cylinder 1 with the maximum lift for the intake valve 18 fluctuates. The fluctuation amount is within the range of about 40% of the opening area N3 of the opening 1a of the cylinder with the maximum lift at idle (which is about 5% of the opening area N1 with the maximum lift in the maximum power state) and also within the range of ±20% of the average.

The fluctuation ratio of the opening area N of the opening 1a increases as the lift amount of the intake valve 18 decreases. The fluctuation ratio of the opening area N of the opening 1a is particularly large in the region corresponding to about 13% or less of the opening area N1 with the maximum lift for the intake valve 18 (the lift unstable region in FIG. 8) in the maximum power state.

Therefore, at idle, the valve actuator 20 is controlled so that the lower limit for the opening area N3 of the opening 1a with the maximum lift including the amount of fluctuation (that corresponds to about 5% of the opening area N1 with the maximum lift in the maximum power state) is substantially equal to the upper limit of the lift unstable region. In this way, the fluctuation ratio of the opening area N of the opening 1a can be prevented from being excessively large in the low load state.

In the maximum power state, the valve actuator 20 is controlled so that the lower limit for the opening area N1 of the opening 1a with the maximum lift including the amount of fluctuation is substantially equal to the opening area M1 of the opening 7a of the intake passage 7.

The valve actuator 20 is controlled so that the lift amount of the intake valve 18 is larger when the fluctuation ratio in the engine speed of the engine 100 is not less than a prescribed value. In this way, the ratio of the fluctuation amount in the lift amount of the intake valve 18 to the lift amount of the intake valve 18 is small. Therefore, the ratio of fluctuation in the engine speed of the engine 100 is small, so that the engine 100 can be operated in a stable manner.

(5) Working Angle of Intake Valve

Figure 9:
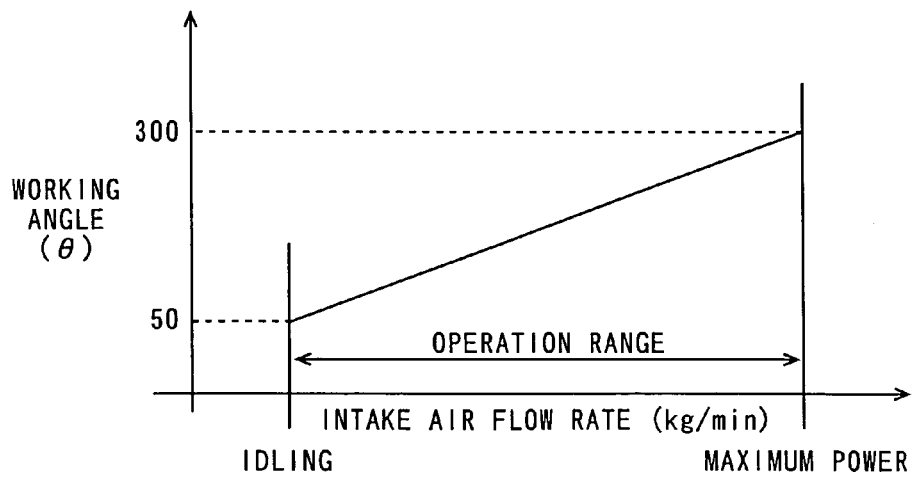
FIG. 9 is a graph illustrating the working angle of the intake valve in the engine in FIG. 1.

FIG. 9 is a graph illustrating the working angle of the intake valve in the engine in FIG. 1. The abscissa in FIG. 9 represents the intake air flow rate (kg/min), and the ordinate represents the working angle (θ) of the intake valve 18. Note that the working angle represents the valve opening period of the intake valve 18 by the angle of the crank 4.

As shown in FIG. 9, the intake valve 18 is controlled in the high load state (the maximum power state) of the engine 100 so that as its lift amount increases, the working angle increases to about 300°.

The intake valve 18 is controlled in the extremely low load state of the engine 100 (at idle) so that as its lift amount decreases, the working angle decreases to about 50°.

(6) Method of Controlling Hydraulic Valve Driving Device

Figure 10:
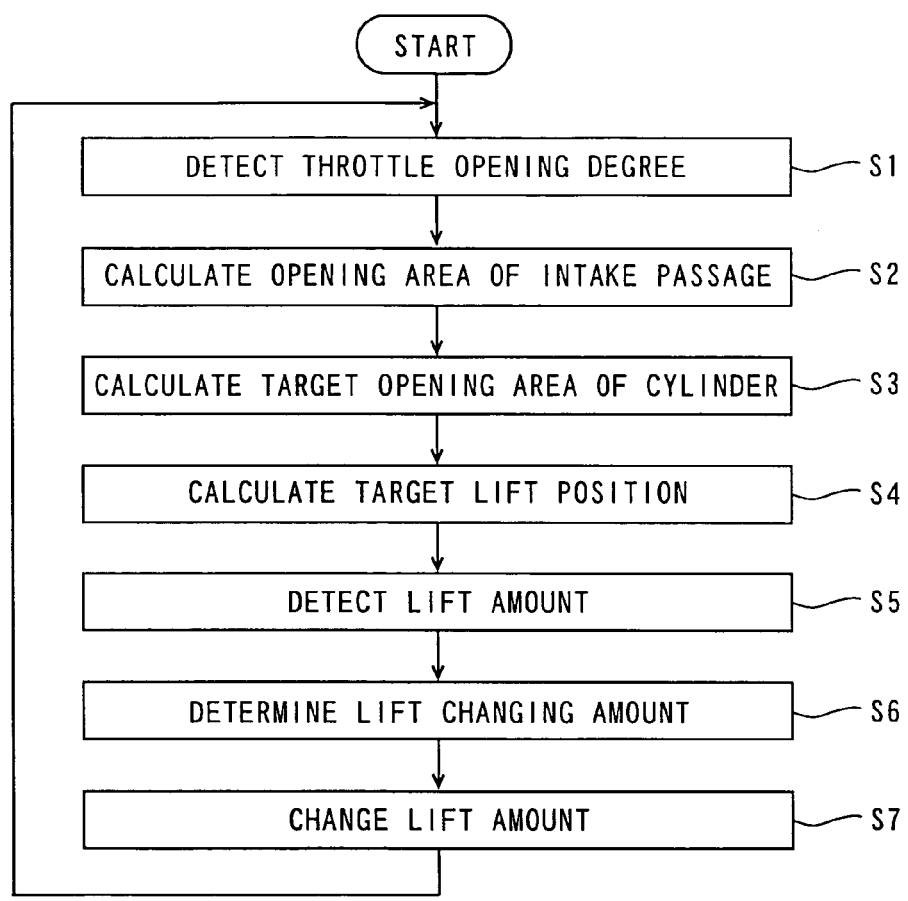
FIG. 10 is a flowchart illustrating a method of controlling the hydraulic valve driving device in FIG. 1.

FIG. 10 is a flowchart illustrating a method of controlling the hydraulic valve driving device in FIG. 1. Now, with reference to FIG. 10, a method of controlling the hydraulic valve driving device using the engine control unit 14 in FIG. 1 will be described in detail.

The engine control unit 14 (see FIG. 1) detects the throttle opening degree based on the throttle opening degree signal SO from the throttle opening degree sensor 16 (see FIG. 1) (step S1). The engine control unit 14 calculates the opening area M of the opening 7a in the intake passage 7 based on the throttle opening degree (step S2).

The engine control unit 14 calculates a target opening area for the opening 1a of the cylinder 1 (step S3) and target lift positions for the intake valve 18 and the exhaust valve 19 (step S4).

Then, the engine control unit 14 detects the lift amounts of the intake valve 18 and the exhaust valve 19 (see FIG. 1) based on the intake valve lift signal IL and the exhaust valve lift signal EL from the valve lift sensors 22 and 23, respectively (see FIG. 1)(step S5).

The engine control unit 14 then determines the lift fluctuation amounts of the intake valve 18 and the exhaust valve 19 based on the target lift positions calculated in step S4, and the detected lift amounts of the intake valve 18 and the exhaust valve 19 (step S6).

Then, the engine control unit 14 changes the lift amounts of the intake valve 18 and the exhaust valve 19 by the lift fluctuation amounts using the control valve 24 (see FIG. 1) and the valve actuators 20 and 21 (step S7).

(7) Advantage of Preferred Embodiment

According to the preferred embodiment, during intake operation in substantially all the load states of the engine 100 from the low load state to the high load state, the opening area N of the opening 1a of the cylinder 1 determined by the lift amount of the intake valve 18 is controlled to be not less than the opening area M of the opening 7a determined by the opening degree of the throttle valve 10.

In this way, in substantially all the load states, the quantity of air taken into the engine 100 can be controlled by the throttle valve 10. Therefore, it is not necessary to switch between the control by the throttle valve 10 and the control by the intake valve 18 among different load conditions of the engine 100, and the throttle valve 10 does not have to be operated independently of the accelerate operation. This eliminates the necessity for an additional driving device such as an actuator that allows the throttle valve 10 to operate independently of the accelerate operation. Therefore, the engine 100 can have a simplified structure.

The quantity of air taken into the engine 100 can be controlled using the throttle valve 10, and therefore if the lift amount of the intake valve 18 fluctuates, the quantity of air to be sent into the cylinder 1 can be prevented from fluctuating. Consequently, the engine speed of the engine 100 can be prevented from fluctuating.

Consequently, the engine speed of the engine 100 can be prevented from fluctuating without the necessity of complicating the structure of the engine 100.

In addition, using the valve actuator 20 that can arbitrarily control the lift amount of the intake valve 18, the intake valve does not have to be lifted more than necessary in the extremely low load state such as at idle. This allows the energy loss to be reduced.

According to the preferred embodiment, during intake operation in substantially all the load states of the engine 100, the average flow rate v1 ($kg/m^2 \cdot s$) at the opening 1a determined by the lift amount of the intake valve 18 is controlled to be not more than the average flow rate v2 ($kg/m^2 \cdot s$) at the opening 7a determined by the opening degree of the throttle valve 10.

In this way, the quantity of air taken into the cylinder 1 can readily be controlled using the throttle valve 10. Therefore, during intake operation, when the lift amount of the intake valve 18 fluctuates, the quantity of air taken into the cylinder 1 can readily be prevented from fluctuating. Consequently, the engine speed of the engine 100 can readily be prevented from fluctuating.

Furthermore, according to the preferred embodiment, when the lift amount of the intake valve 18 fluctuates, the opening area N of the opening 1a fluctuated because of fluctuation in the lift amount of the intake valve 18 can readily be controlled to be not less than the opening area M of the opening 7a determined by the opening degree of the throttle valve 10 during intake operation in substantially all the load states of the engine 100.

According to the preferred embodiment, the lift amount of the intake valve 18 and the working angle of the crank 4 corresponding to the valve opening period of the intake valve 18 are set to be larger in the high load state of the engine 100 than those in the low load state of the engine 100. In this way, the quantity of intake air in the high load state can be large.

According to the preferred embodiment, the lift amount of the intake valve 18 is set to be smaller in the low load state of the engine 100 than that in the high load state of the engine 100. In this way, the intake valve 18 can be prevented from being driven more than necessary in the low load state of the engine 100. This allows the energy loss to be reduced.

Furthermore, in the low load state of the engine 100, the working angle of the crank 4 corresponding to the valve opening period of the intake valve 18 is set to be small, so that the opening 1a can be prevented from being opened in exhaust strokes. In this way, exhaust gas can be prevented from returning to the intake passage 7 through the opening 1a.

(8) Motorcycle

Figure 11:
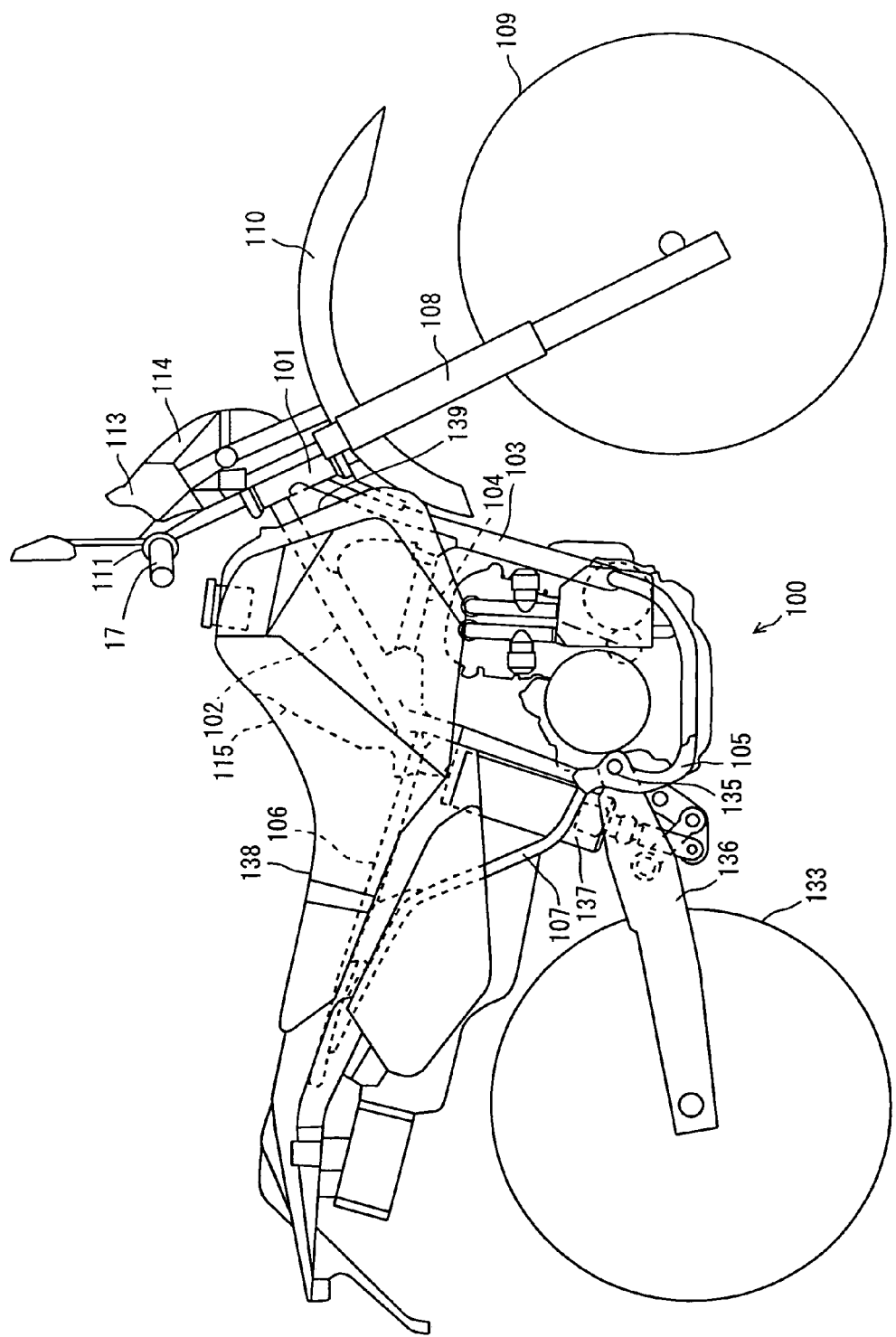
FIG. 11 is a side view of an example of a motorcycle including the engine system in FIG. 1.

FIG. 11 is a side view of an example of a motorcycle including the engine system in FIG. 1.

In the motorcycle in FIG. 11, a main frame 102 and the front end of a down tube 103 are connected to a head pipe 101. The main frame 102 is formed to extend obliquely downwardly to the back. The down tube 103 is positioned more to the front and the under side of the main frame 102 to extend downwardly to the back. The main frame 102 and the down tube 103 are connected by a backstay 104 and a pivot shaft supporter 105.

A seat rail 106 is connected at the center of the main frame 102. A backstay 107 is connected between the rear end of the main frame 102 and the rear part of the seat rail 106.

A pair of front forks 108 is provided under the head pipe 101. A front wheel 109 is rotatably attached to the under side of the pair of front forks 108. A front fender 110 is provided to cover the upper part of the front wheel 109.

A handle 111 is pivotably attached to the upper end of the head pipe 101. The throttle grip 17 in FIG. 1 is attached to the end of the handle 111. A front cowl 113 and a headlight 114 are provided in front of the handle 111.

A fuel tank 115 is attached across the main frame 102. The engine 100 in FIG. 1 is provided under the main frame 102.

The pivot shaft supporter 105 connected to the main frame 102 is provided with a pivot shaft 135. The front end of a rear arm 136 is supported by the pivot shaft 135 so that it can swing in the vertical direction. A shock absorber 137 serving to attenuate the impact of the rear arm 136 is provided inside the rear arm 136.

A rear wheel 133 is rotatably attached to the rear end of the rear arm 136. The torque of the drive shaft of the engine 100 is transmitted to the rear wheel 133 through a transmission and a chain.

A seat 138 is provided on the seat rail 106. A vehicle cover 139 is attached to cover the fuel tank 115 and the seat rail 106.

The motorcycle in FIG. 11 includes the engine system according to the preferred embodiment described above, and therefore the engine speed of the engine 100 can be prevented from fluctuating without the necessity of complicating the structure of the engine 100.

(9) Other Preferred Embodiments

Figure 12:
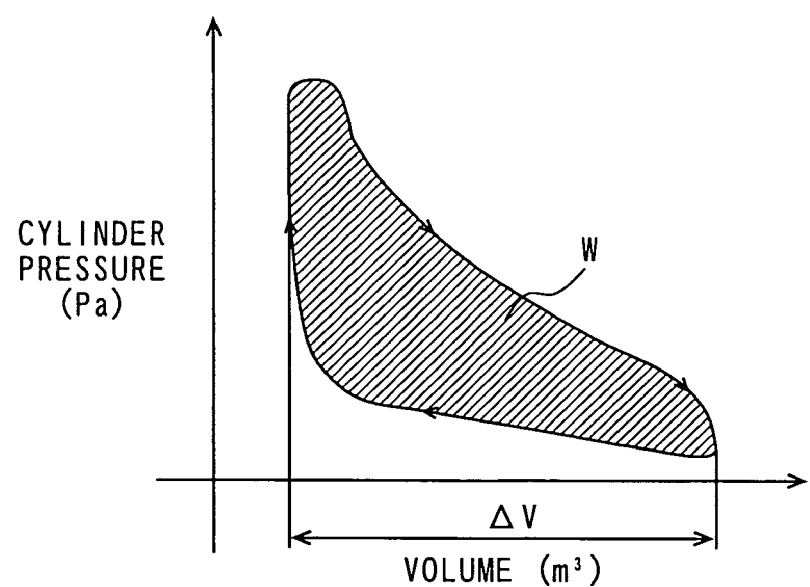
FIG. 12 is a graph illustrating the indicated mean effective pressure of an engine according to another preferred embodiment of the invention.

FIG. 12 is a graph illustrating the indicated mean effective pressure of an engine according to another preferred embodiment of the invention.

According to the preferred embodiment described above, the operation of the engine 100 is stabilized by setting the lift amount of the intake valve 18 to a high level when the ratio of fluctuation in the engine speed of the engine 100 is not less than a prescribed value, while the invention is not limited to the preferred embodiment, and the operation of the engine maybe stabilized by setting the lift amount of the intake valve to a high level when the ratio of fluctuation in the indicated mean effective pressure of the engine 100 is not less than a prescribed value.

The indicated mean effective pressure refers to a value produced by dividing work W per cycle of the engine shown in FIG. 12 (the area of the hatching region in FIG. 12) by stroke volume $\Delta V$.

According to the preferred embodiment described above, the mass flow sensor 12 is provided upstream of the intake passage 7 in order to measure the intake amount of the cylinder 1 but the invention is not limited to the preferred embodiment and an intake air pressure sensor may be provided in order to measure the intake amount of the cylinder 1. The intake air pressure sensor is desirably provided downstream of the intake passage 7.

In addition, according to the preferred embodiment described above, the hydraulic valve driving device is used to control the lift amount of the intake valve 18 but the invention is not limited to the preferred embodiment and an electromagnetic valve driving device may be used to control the lift amount of the intake valve 18.

Furthermore, according to the preferred embodiment described above, a motorcycle has been described as an example of a vehicle employing the engine system according to the invention, but the invention is not limited to the preferred embodiment and is applicable to any other vehicle having an engine system including a valve driving device such as an automobile, a tricycle, and an ATV (All Terrain Vehicle; vehicle designed for off-road use). The engine system including the valve driving device according to the invention may be applied to a mechanical apparatus such as a generator other than such vehicles.

(10) Correspondences between Elements Recited in Claims and Those in Preferred Embodiments In the following paragraph, non-limiting examples of correspondences between various elements recited in the claims below and those described above with respect to various preferred embodiments of the present invention are explained.

In the preferred embodiments described above, the opening 1a corresponds to the first opening, and the opening 7a corresponds to the second opening. The engine control unit 14 corresponds to the control device, the first opening area calculator, the second opening area calculator, the target lift position calculator, and the lift fluctuation amount determiner. The throttle opening degree sensor 16 corresponds to the throttle opening degree detector, the valve actuator 20 corresponds to the valve driving device, and the valve lift sensor 22 corresponds to the lift amount detector. The low load state corresponds to the first load state and the high load state corresponds to the second load state.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An engine system comprising:
an engine; and
a control device that controls the engine,
the engine comprising:
a cylinder having a first opening;
an intake valve that opens and closes the first opening;
a valve driving device operable to drive the intake valve and arbitrarily control the lift amount of the intake valve;
an intake passage having a second opening and arranged to introduce air and fuel into the cylinder from the first opening through the second opening; and
a throttle valve provided to open and close the second opening of the intake passage and control the quantity of air to be introduced into the cylinder in response to a load required by a user,
during intake operation in substantially all the load states of the engine, the control device controlling the valve driving device so that the opening area of the first opening determined by the lift amount of the intake valve is at least equal to the opening area of the second opening determined by the opening degree of the throttle valve.

2. The engine system according to claim 1, wherein during intake operation in substantially all the load states of the engine, the control device controls the valve driving device so that the average flow rate at the first opening determined by the lift amount of the intake valve is at most equal to the average flow rate at the second opening determined by the opening degree of the throttle valve.

3. The engine system according to claim 2, wherein during intake operation in substantially all the load states of the engine, the control device controls the valve driving device so that the average flow rate at the first opening determined by the lift amount of the intake valve is substantially equal to the average flow rate at the second opening by the throttle valve.

4. The engine system according to claim 1, wherein the lift amount of the intake valve during intake operation fluctuates, and when the opening area of the first opening fluctuates because of fluctuation in the lift amount of the intake valve, during intake operation in substantially all the load states of the engine, the control device controls the valve driving device so that the fluctuated opening area of the first opening is at least equal to the opening area of the second opening determined by the opening degree of the throttle valve.

5. The engine system according to claim 1, wherein the substantially all the load states of the engine include a predetermined first load state and a second load state higher than the first load state, and the control device controls the valve driving device so that the difference between the opening area of the first opening determined by the lift amount of the intake valve and the opening area of the second opening determined by the opening degree of the throttle valve in the first load state is greater than that in the second load state.

6. The engine system according to claim 5, wherein the control device controls the valve driving device so that the difference between the opening area of the first opening determined by the lift amount of the intake valve and the opening area of the second opening determined by the opening degree of the throttle valve in the first load state gradually increases from the second load state to the first load state.

7. The engine system according to claim 1, wherein the control device controls the valve driving device so that in a substantially maximum power state of the engine, the opening area of the first opening determined by the lift amount of the intake valve is substantially equal to the opening area of the second opening determined by the opening degree of the throttle valve.

8. The engine system according to claim 1, further comprising:

a throttle opening degree detector that detects the opening degree of the second opening by the throttle valve; and
a lift amount detector that detects the lift amount of the intake valve, wherein
the control device controls the valve driving device based on the results of detection by the throttle opening degree detector and the lift amount detector.

9. The engine system according to claim 8, wherein the control device comprises:

a first opening area calculator that calculates the opening area of the second opening determined by the opening degree of the throttle valve based on the result of detection by the throttle opening degree detector;
a second opening area calculator that calculates the opening area of the first opening corresponding to the opening area of the second opening based on the result of calculation by the first opening area calculator;
a target lift position calculator that calculates a target lift position based on the result of calculation by the second opening area calculator;

a lift fluctuation amount determiner that determines a lift fluctuation amount based on the result of calculation by the target lift position calculator and the result of detection by the lift amount detector; and
a lift amount changer that changes the lift amount of the intake valve by the valve driving device by the lift fluctuation amount determined by the lift fluctuation amount determiner.

10. The engine system according to claim 1, wherein the control device controls the valve driving device so that the lift amount of the intake valve increases when at least one of the ratio of fluctuation in the engine speed of the engine and the ratio of fluctuation in the indicated mean effective pressure of the engine is at least equal to a prescribed value.

11. The engine system according to claim 1, wherein the substantially all the load states of the engine include a predetermined first load state and a second load state higher than the first load state, and the control device controls the valve driving device so that the lift amount of the intake valve and the working angle of a crank corresponding to the opening period of the intake valve in the second load state are larger than those in the first load state.

12. The engine system according to claim 1, wherein the substantially all the load states of the engine include a predetermined first load state and a second load state higher than the first load state, and the control device controls the valve driving device so that the lift amount of the intake valve and the working angle of a crank corresponding to the opening period of the intake valve in the first load state are smaller than those in the second load state.

13. A vehicle, comprising:

an engine;
a driving wheel rotated by power generated by the engine; and
a control device that controls the engine,
the engine comprising:
a cylinder having a first opening;
an intake valve that opens and closes the first opening;
a valve driving device operable to drive the intake valve and arbitrarily control the lift amount of the intake valve;
an intake passage having a second opening and arranged to introduce air and fuel into the cylinder from the first opening through the second opening; and
a throttle valve provided to open and close the second opening of the intake passage and control the quantity of air to be introduced into the cylinder in response to a load required by a user,
during intake operation in substantially all the load states of the engine, the control device controlling the valve driving device so that the opening area of the first opening determined by the lift amount of the intake valve is at least equal to the opening area of the second opening determined by the opening degree of the throttle valve.

* * * * *